C. FORTH.
PIPE JOINT.
APPLICATION FILED FEB. 8, 1912.
1,145,578.
Patented July 6, 1915.
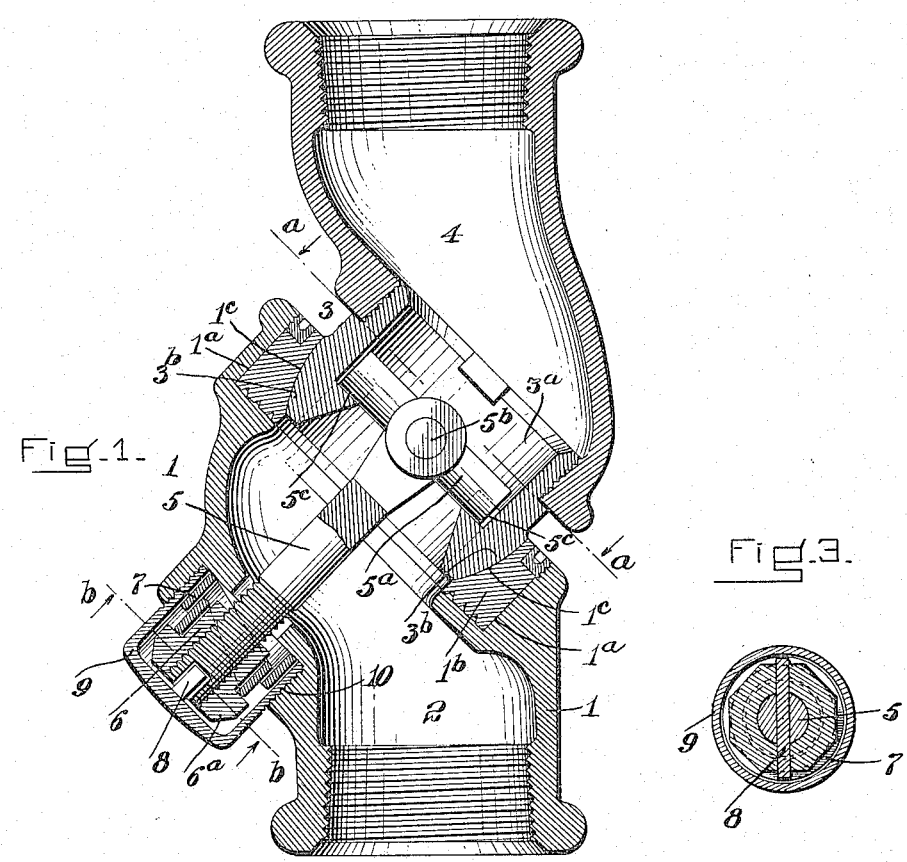
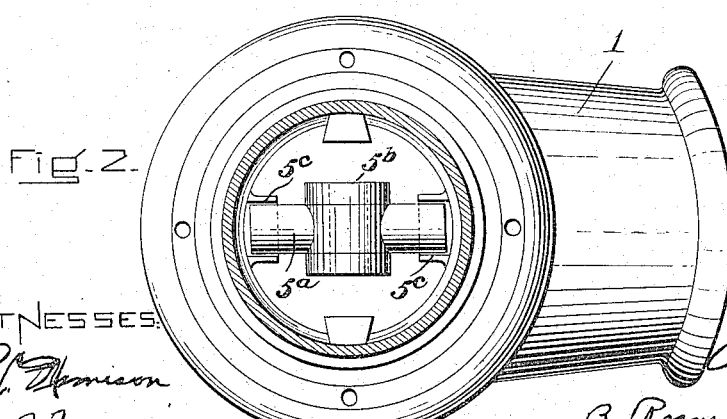

UNITED STATES PATENT OFFICE.

CHARLES FORTH, OF BOSTON, MASSACHUSETTS.

PIPE-JOINT.

1,145,578.　　　　　Specification of Letters Patent.　　Patented July 6, 1915.

Application filed February 8, 1912. Serial No. 676,185.

*To all whom it may concern:*

Be it known that I, CHARLES FORTH, a citizen of the United States, residing at Boston, in the county of Suffolk and State of Massachusetts, have invented certain new and useful Improvements in Pipe-Joints, of which the following is a specification, reference being had therein to the accompanying drawing.

This invention relates to pipe joints, the objects of the invention being to produce a joint which, while permitting the parts to be moved relative to each other with the greatest latitude and freedom, will at the same time afford a passage for the fluid, free from obstructing turns or angles, and will effectually prevent the leakage of the fluid between the parts.

My invention is designed with special reference to the use of the improved joint in connection with railway train pipe systems for air or steam, to enable pipe terminals of metal to be employed between the cars, instead of rubber, and the invention consists in a joint of the "ball and socket" type, comprising two members seated one within the other so that they may rock relatively in all directions, and connected together by a bolt or stem, around the longitudinal axis of which the members are capable of a relative turning movement, the said members being provided respectively with coupling necks whose axes are arranged obliquely with respect to the axis of the connecting stem. As a result of this arrangement and disposition of the parts, the axis of the coupling necks form obtuse angles in relation to the axis of the stem, so that the passage through the joint is free from sudden and sharp turns.
The invention consists also in certain details of construction and combination of parts hereinafter described and claimed.

In the accompanying drawings: Figure 1 is a longitudinal section through a joint embodying my invention. Fig. 2 is a transverse sectional elevation on the line *a—a* of Fig. 1, as viewed in the direction of the arrow in said Fig. 1. Fig. 3 is a section on the line *b—b* of Fig. 1, showing the means for locking the fastening nut against accidental movement.

My improved joint comprises a socket member 1, provided with a coupling neck 2, and a ball member 3, provided with a coupling neck 4, the said parts being hollow and connected together by a connecting bolt or stem 5, so that a continuous passage way is formed through said parts for the flow of the fluid under control.

The socket member is formed in its face with an annular recess $1^a$ in which is firmly and fixedly seated a ring $1^b$, preferably of graphite, the inner side of which ring is formed with a curved or spherical surface or socket $1^c$, constituting a seat for the ball member of the joint, the neck 2 of the socket member 1 extending from the socketed face in a line oblique to the plane of said face, with the axis of the neck forming an obtuse angle with reference to the axis of the socket.

The ball member is threaded in its face to receive a ring or collar $3^a$, preferably of brass, the projecting portion of which is curved spherically, forming a spherical head or "ball" $3^b$, which is seated in the spherical socket $1^c$, so as to be capable of a universal rocking as well as turning movement therein, the neck 4 of said member extending from the spherical head in a line oblique to the axis of the head and forming in connection with said axis, an obtuse angle.

The connecting bolt 5 before alluded to, is connected to the ball member through the medium of a cross pin $5^a$, to which one end of the bolt is pivoted on a transverse axis $5^b$, the ends of said pin being seated so as to rock in sockets $5^c$, arranged at diametrically opposite points on the interior of the collar $3^a$, the point of pivotal connection of the bolt with the pin being coincident with the center of the spherical surfaces $1^c$ and $3^b$. From this point the bolt extends into the socket member of the joint and outwardly through the side of the same, the end of the bolt being threaded and provided with a confining nut 6. The confining nut is provided with an annular head $6^a$ between which and the side of the member 1, a strong spiral spring 7 is seated, so that when under tension, it will hold the two parts of the joint together with a yielding or spring pressure. When thus connected, the two members are capable of a universal relative rocking and turning motion, the rocking motions being on the axes of the connection of the pin with the collar and the connection of the bolt with the pin; and the turning motion being about the longitudinal axis of the bolt. In the relative turning motion of the parts, the nut is prevented from turning relatively to the bolt in either direction, by means of a key 8, which is seated in alining recesses in the end of the nut and the end of the bolt, as shown in Fig. 3, a cap 9 being applied to the exposed end of the bolt, and screwed into an interiorly-threaded boss 10 projecting from the member 1, this cap, when it is screwed down into place, abutting at its upper end against the key and thus preventing the same from escaping from the slots.

As a result of this construction, and by reason of the relation of the necks on the two members to the axes of the same, the passage through the joint is practically straight and unobstructed by sharp turns or angles. Consequently, the fluid will have a free course in its flow through the joint. Furthermore, the greatest latitude of relative movement of the parts is permitted. This capability of freedom of movement in all directions, admirably adapts the joint to be used in connection with metal pipes, as it secures the flexibility of action characteristic of rubber pipe terminals, with all the attendant advantages, but avoids the disadvantages and dangers of rupture or wear to which the rubber terminals are subject.

By extending the connecting bolt through the side of the socketed member, its outer end and the confining nut thereon are exposed, so that the tension of the spring may be readily adjusted when desired; or the joint may be conveniently separated when there is occasion for access being had to its interior.

The effect of the particular relation of the axes of the coupling necks to the axis of the connecting bolt, is to form a passage through the joint which is free from any abrupt turns, such as the right-angular turns characteristic of most pipe joints. In my improved joint the fluid entering one of the necks in a longitudinal direction, corresponding to the axis of said neck, takes a turn to one side in a line forming an obtuse angle with respect to the direction of its entrance, and continuing, leaves the joint by the other neck in a direction coincident with the axis of this latter neck and in a line forming an obtuse angle with reference to its first deflection. Hence, the obstruction offered to the passage of the fluid is reduced to a minimum, and its flow through the pipe, therefore, rendered easy and continuous.

In the accompanying drawings and foregoing description, I have set forth my invention in the particular form which I deem most advantageous for realizing the effects, advantages and results of the invention; but it will be understood that the invention is not limited to the details shown, but is capable of changes and modifications such as would suggest themselves to the skilled mechanic. And it will be understood further that the invention is not limited to any particular form or construction of the parts except in so far as such limitations are specified in the claim.

Having thus described my invention, what I claim is:

In a pipe joint, the combination of a ball member comprising a hollow coupling neck provided with a hollow terminal spherical head whose axis is disposed obliquely relatively to the axis of the neck, said head being provided with internal sockets disposed diametrically on opposite sides, a socket member comprising a hollow coupling neck provided with a terminal socket whose axis is disposed obliquely relatively to the axis of the neck and in which socket the spherical head is seated and adapted to rock universally and to swivel about a common axis intersecting the axes of the coupling necks, a pin seated loosely at its ends in the internal sockets in the head, a connecting bolt pivoted to the pin to rock relatively thereto and extending outwardly through the side of the socket member, an adjustable head on the bolt and a spring seated between the head and exterior of the socket member and tending to maintain the two members yieldingly in fluid-tight contact, while permitting of their relative universal motions and their relative swiveling motions.

In testimony whereof I affix my signature in presence of two witnesses.

CHARLES FORTH.

Witnesses:
RALPH N. BUTTERWORTH,
THOMAS A. MULLEN.

Copies of this patent may be obtained for five cents each, by addressing the "Commissioner of Patents, Washington, D. C."